United States Patent [19]

Millward

[11] 3,959,126

[45] May 25, 1976

[54] SEWAGE HANDLING AND DISPOSAL PROCESS FOR CHLORIDE (NACL) CONTAMINATED SLUDGES

[75] Inventor: Richard S. Millward, Stratford, Conn.

[73] Assignee: Dorr-Oliver Incorporated, Stamford, Conn.

[22] Filed: Aug. 17, 1972

[21] Appl. No.: 281,419

[52] U.S. Cl. ................................. 210/10; 210/64; 210/68; 210/73 S; 210/78
[51] Int. Cl.² ........................................... C02C 5/06
[58] Field of Search ............. 210/10, 18, 64, 66–68, 210/71, 73 SG; 204/149

[56] References Cited
UNITED STATES PATENTS

| | | | |
|---|---|---|---|
| 1,967,197 | 7/1934 | Besselievre | 210/68 |
| 2,755,293 | 7/1956 | McDonald | 210/10 X |
| 2,846,072 | 8/1958 | Goetz | 210/10 X |
| 3,172,845 | 3/1965 | Manning | 210/66 X |
| 3,226,317 | 12/1965 | Albertson | 210/67 X |
| 3,414,513 | 12/1968 | Buhl et al. | 210/10 X |
| 3,580,193 | 5/1971 | Logan et al. | 210/10 X |
| 3,622,508 | 11/1971 | Komline | 210/67 X |

OTHER PUBLICATIONS

"Electrolytic Treatment", *Sewage Disposal*, Fuller, 1912, pp. 550–552, McGraw–Hill.
Betz Handbook of Industrial Water Conditioning, 5th Edition, 1957, pp. 152–159.

*Primary Examiner*—Charles N. Hart
*Assistant Examiner*—Robert H. Spitzer
*Attorney, Agent, or Firm*—Theodore M. Jablon; Burtsell J. Kearns

[57] ABSTRACT

A method for the treatment and disposal of sewage sludges containing chlorides (NaCl) as from infiltrating salt water, which involves heat treatment capable of producing readily disposable sludges, due to the resulting destruction of pathogenic organisms and improved filtrability of the sludge, featuring the washing displacement of NaCl from the sludge preceding the heat treatment operation, for protection of the sludge heating equipment.

6 Claims, 6 Drawing Figures

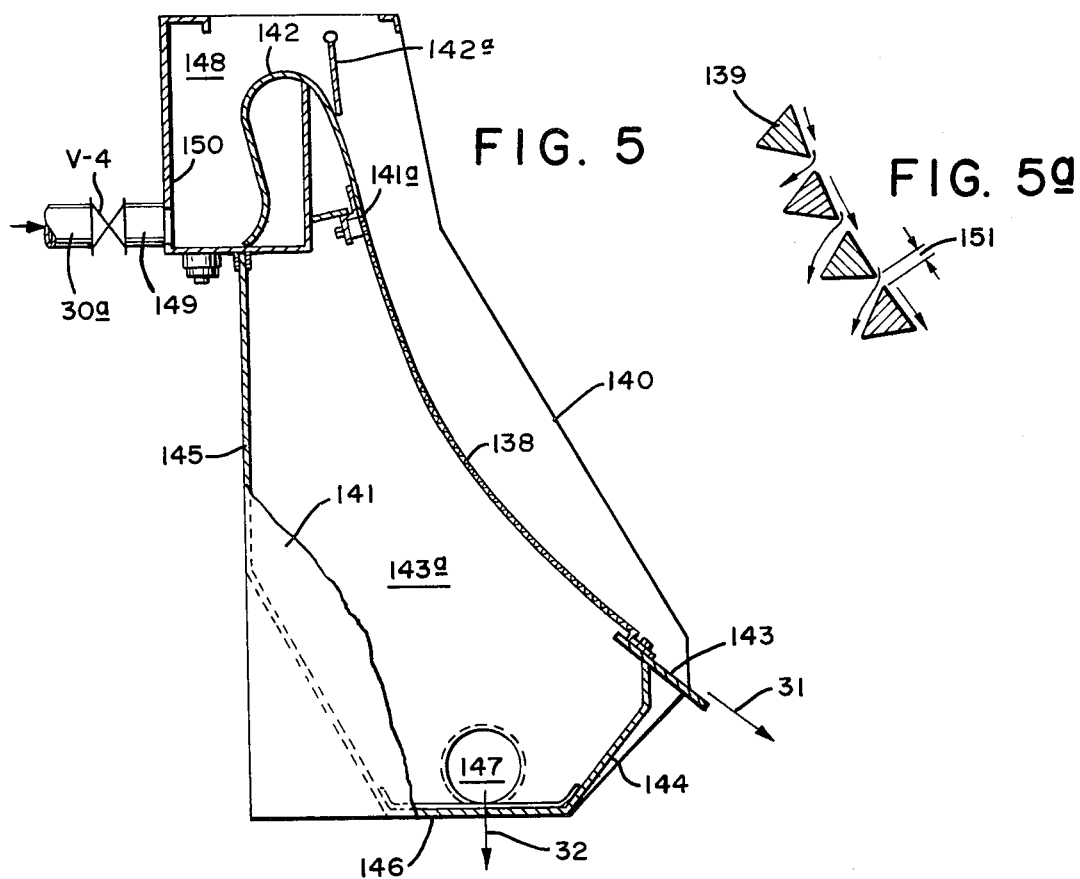
FIG. 5
FIG. 5a
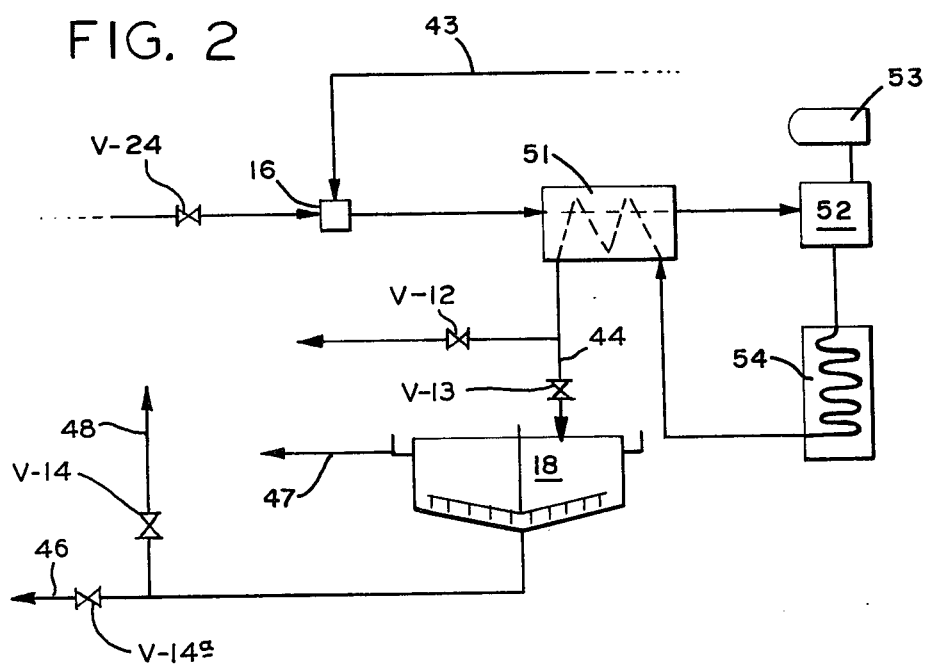
FIG. 2

SEWAGE HANDLING AND DISPOSAL PROCESS FOR CHLORIDE (NACL) CONTAMINATED SLUDGES

This invention relates to the disposal of raw sewage sludges, for instance the so-called primary and secondary sludges produced by a conventional sewage treatment plant.

In such a treatment plant, raw sewage enters a continuous primary clarifier tank producing the primary sludge as underflow containing readily settleable solids at a total concentration in a range from about ½ to about 5% depending upon the manner of operation, such as the rate of sludge withdrawal. This primary sludge in turn lends itself to thickening whereby a solids concentration in the order of 10% is attainable.

The overflow from the primary tank containing non-settleable and dissolved sewage matter is subjected to biological treatment, effective to convert unsettleable and dissolved matter into settleable biologic floc structures.

The floc-laden effluent, when subjected to sedimentation in a secondary clarifier tank, produces the secondary sludge as underflow at a concentration of only about ½ to 2% T.S., while clarified effluent may discharge into open bodies of water.

This highly dilute secondary sludge presents a disposal problem since, due to its flocculent nature, it resists further concentration.

Heretofore, the disposal problem has been dealt with for example by combining the primary and secondary sludges and subjecting them to anaerobic digestion, producing an inoffensive sludge for disposal, such as on land or to sea. Another method requires that the mixed, thickened sludges be subjected to mechanical dewatering, as in a centrifuge, using chemicals for conditioning to a solids concentration of say 10 to 25%, and subsequent combustion of the dewatered cake.

In contrast with such prior practices, the present invention concerns itself with a disposal method whereby raw sludge is subjected to heat treatment at temperatures in the order of 350° to 450°F whereby the sludge becomes inoffensive due to the destruction of pathogenic organisms, and disposable as is, or after further concentration. Also by this heat treatment, the structure of the sludge is altered, with the result that the dewatering characteristics of the sludge are substantially improved, thus overcoming the aforementioned problem of secondary sludge concentration, rendering the dewatered sludge more suitable for combustion.

This invention is concerned with overcoming a problem encountered in the operation of the heat treatment system in localities where infiltration of seawater into the sewage system presents a hazard to the heat treating apparatus due to the high corrosiveness of NaCl at the required high heat treating temperatures.

This invention aims to avoid the necessity of having the heat treating apparatus constructed of expensive corrosion resisting alloy, as has been heretofore proposed.

To that end, the invention purposes to prepare the sludge for the heat treatment stage by first subjecting it to a washing-or displacement operation whereby NaCl among other solubles is eliminated from the sludge. After the NaCl has been removed or reduced to an acceptable level, it is subjected to the heat treatment operation. The resulting inoffensive sludge, herein also termed sterilized sludge, may be disposed of in any suitable manner, for example by delivery out to sea, or on land, or it may be thickened and further mechanically dewatered, producing a moist cake material suitable for land fill, or else for combustion.

It is desirable, of course, to have the thus conditioned or pre-treated sludge delivered to the heat treatment station at the highest possible solids concentration, but with low levels of NaCl.

The invention therefore proposes to combine a solubles (NaCl) washing- or displacement operation with a sludge thickening- or solids concentrating operation.

Consequently, according to a practical feature, the highly dilute secondary sludge is subjected to forced concentration in a nozzle type centrifugal machine. In such a machine, provision is made for controllable underflow recirculation through a return connection whereby the degree of underflow concentration is controllable. Also provided is a controllable supply of wash water entering the return connection for effecting displacement of the mother liquor containing solubles. By suitable control of the underflow recirculation rate and of the rate of wash water supply, this machine if employed for the purposes of this invention will deliver the underflow at a desired solids concentration yet substantially freed of the objectionable NaCl, which will be contained in the overflow of the machine, returning to the treatment plant.

Based upon the above stated underlying concept of NaCl-removal from raw sludge preparatory to the heat treatment of the thus conditioned sludge, the invention lends itself to a variety of embodiments exemplified as follows:

A.
Raw Sludge subjected directly to biological treatment (i.e., without Primary sedimentation) and sedimentation:
1. NaCl removal by washing and re-thickening or by a solubles displacement operation;
2. Heat Treatment of the thus conditioned sludge; and
3. Disposal of the resulting inoffensive sludge, for example by:
   a. thickening — dewatering — combustion; or
   b. disposal on land or to sea, with or without thickening — dewatering.

B.
Secondary Sludge is subjected to:
1. NaCl removal by a washing and re-thickening or by a solubles displacement operation;
2. Heat Treatment of the thus conditioned sludge; and
3. Disposal of the resulting inoffensive sludge, for example by:
   a. thickening — dewatering — combustion; or
   b. disposal on land or to sea, with or without thickening — dewatering.
Primary Sludge subjected to any suitable method of disposal, without previous NaCl-removal, for example by:
   a. digestion — land or sea disposal;
   b. thickening — dewatering — combustion.

C.
Secondary Sludge subjected to:
1. Separate NaCl removal (washing nozzle centrifuge).
Primary Sludge subjected to:

1. Separate NaCl removal.

Disposal: Combining NaCl-freed Primary and Secondary Sludges for Heat Treatment, and disposing the resulting inoffensive sludge by:
   a. thickening — dewatering — combustion; or
   b. disposal on land or to sea, with or without thickening — dewatering.

D.

Mixing Primary and Secondary Sludges:
   1. Subjecting the mixture to NaCl wash removal in a thickening system and re-thickening, as required, or in a solid bowl centrifugal thickener;
   2. Subjecting the NaCl-freed mixture to heat treatment; and
   3. Disposal:
      a. thickening — dewatering — combustion; or
      b. disposal on land or to sea, with or without thickening — dewatering

E.

Secondary Sludge subjected to:
   1. NaCl removal;
   2. Heat Treatment.

Primary Sludge subjected to concentration without NaCl removal.

Disposal: Mixing sterilized Secondary Sludge with unsterilized Primary Sludge, or separately handling and disposing by:
   thickening — dewatering — combustion.

Other features and advantages will hereinafter appear.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

IN THE DRAWINGS

FIG. 2 is a more detailed diagrammatic view of the heat treatment station in FIG. 1.

FIG. 5 is a greatly enlarged vertical sectional view of a screening unit of the type having a curvexly curved screen surface, schematically shown in the flowsheet, and known as the wedge bar type of screen.

FIG. 5a is a greatly enlarged vertical sectional detail view of the wedge bars constituting the convexly curved surface of the screen.

By appropriate setting of the valves shown in the flowsheet various modes of operation may be established, which are described below as Embodiments A, B, C, D, and E respectively.

The treatment involved and symbolically shown as examples in the composite flowsheet, are numerically designated as follows:

| Basic Clarification Treatment | |
|---|---|
| Primary Clarifier Tank | 10 |
| Biological Treatment Tank | 11 |
| Secondary Clarifier Tank | 12 |
| Disposal Treatment of Primary and Secondary Sludges | |
| (Derived from Primary and Secondary Clarifiers resp.) | |
| Degritting Cyclone (for the Primary Clarifier) | 13 |
| Thickener (with or without NaCl-removal Wash) | 14 |
| Washing and Re-thickening Station | 15 |
| Mixing Station | 16 |
| Heat Treatment Station | 17 |
| Decant and Storage Tank | 18 |
| Dewatering Unit | 19 |
| Sludge Combustion Unit | 20 |
| Degritting Cyclone (for the Secondary Clarifier) | 21 |
| Curved Screen | 22 |
| Nozzle Type Washing Centrifuge | 23 |
| Wash and Re-thickening Station | 24 |

Figure 1:
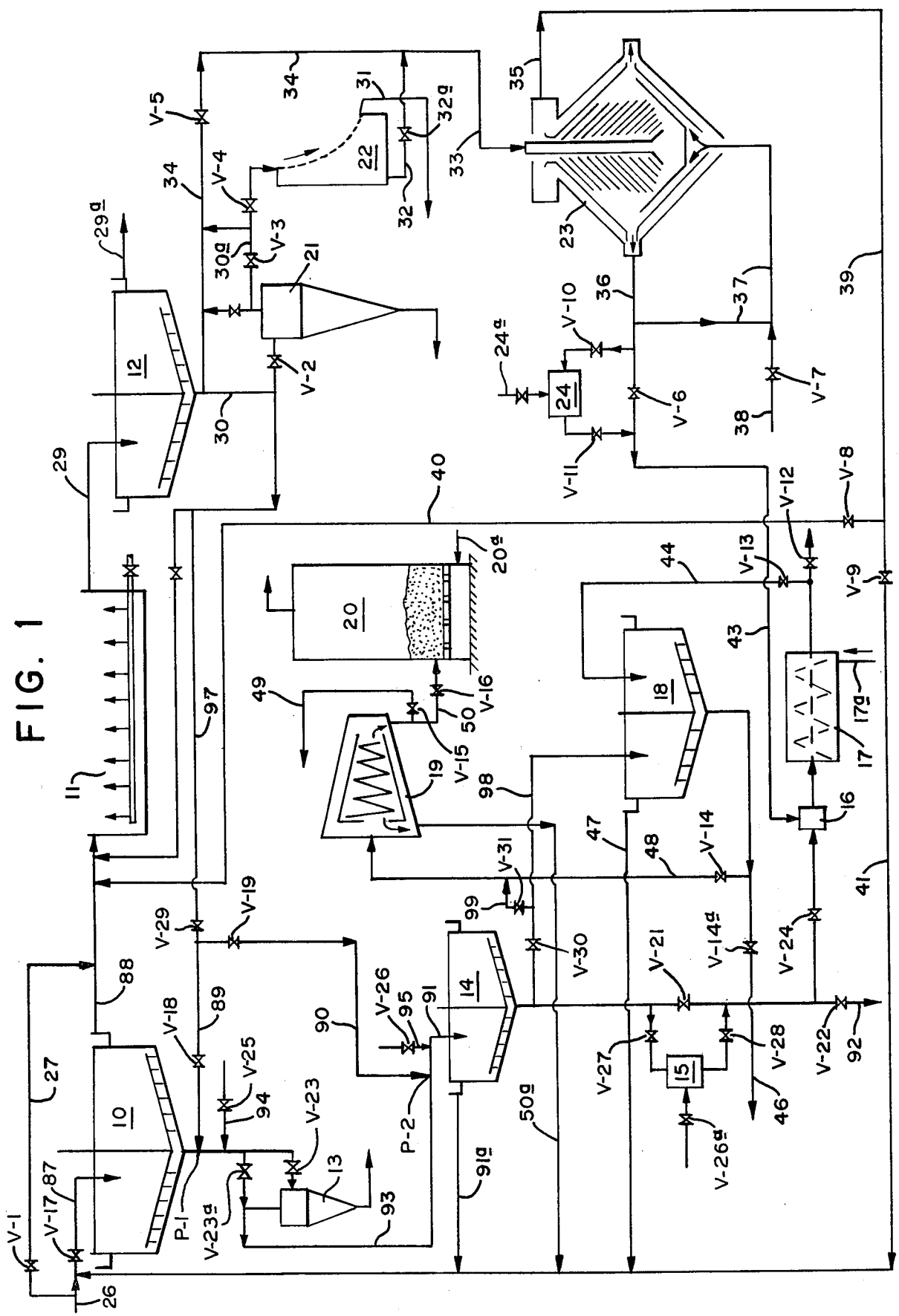
FIG. 1 is a composite flowsheet for sludge treatment and disposal, illustrating various embodiments of the invention, involving a heat treatment station for conditioning the sludge for disposal.

Following is the description of various embodiments of the invention, contained in the composite flowsheet of FIG. 1.

Embodiment A.

In this example, raw sewage 26 containing NaCl by-passes the primary clarifier 10 via conduit 27 and valve V-1, in order to be subjected directly to aerobic treatment in the biological treatment station 11 shown in the form of an aeration tank wherein suspended organic matter as well as solubles are converted into biologic flocs or floc clusters, while NaCl stays in solution.

The floc-laden effluent 29 from the aerating tank passes to the continuously operating secondary clarifier 12 where settling of the flocs produces a dilute sludge usually having a total solids concentration in a range from about ½ to about 2½%, and effluent $29^a$ to be released into the receiving waters, or else to be subjected to a further or tertiary purification treatment.

The dilute secondary sludge via conduit 30 and valve V-2 is subjected to a degritting operation in hydrocyclone 21, to prevent grit from reaching centrifuge 23. The degritted sludge via valves V-3 and V-4 in conduit $30^a$ may then undergo a separating treatment as on the screening unit 22 in order to remove an oversize solids fraction that may not be acceptable to the centrifuge. The screening unit 22 as exemplified is of the type that has a convexly curved screening surface, more clearly shown in FIG. 5, and also exemplified in U.S. Pat. No. 3,259,244. The oversize fraction 31 from the screen may be returned to the treatment process, while the underflow 32 representing the liquid containing the bulk of the organic matter is transferred via supply conduit 32 with valve $32^a$ and conduit 33 to nozzle type centrifuge 23, to be subjected to further concentration. However, a by-pass via valve V-5 in conduit 34 may circumvent this screening operation.

Figure 3:
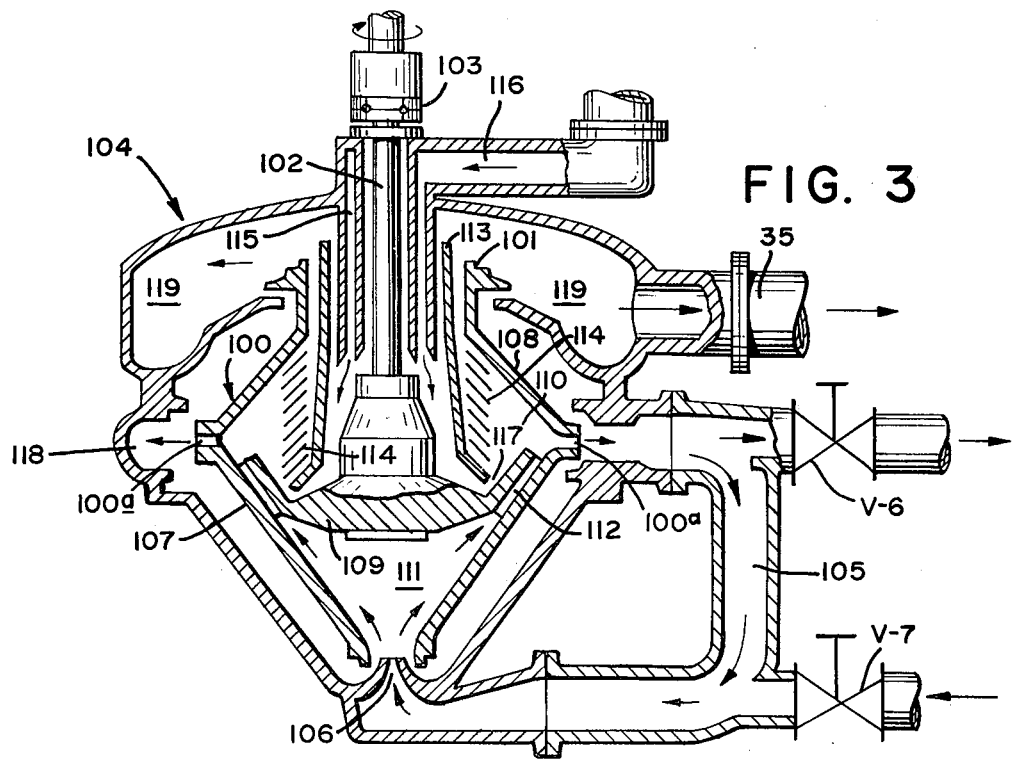
FIG. 3 is a greatly enlarged vertical sectional view of a nozzle type washing centrifuge employed in the flowsheet, schematically shown.

For the purpose of NaCl-removal, the nozzle type centrifuge 23 more clearly shown in FIG. 3, and also exemplified in U.S. Pat. No. 2,559,453, may be operated as a washing centrifuge, in a manner whereby the feed suspension is being concentrated even while solubles including NaCl are being forcibly displaced by wash water into the overflow 35, while nozzle product or underflow concentrate is delivered at 36.

The operation of this centrifuge is controlled by way of adjusting the throttling valve V-6 so as to control the rate of underflow recirculation through return conduit 37, thereby controlling the concentration of the underflow. Wash water 38 is introduced into the return circuit 37 by way of control valve V-7, whereby solubles including NaCl are displaced towards overflow 35 which in turn is returned to process treatment via conduits 39, 40 and 41 and valves V-8 and V-9 respectively. The resulting underflow from the nozzles may have a solids concentration from about 3 to about 8%.

In an alternative mode of operation, the NaCl-removal is effected in a treatment station 24 receiving the underflow from the centrifuge, by-passing the throttle valve V-6 as indicated by valves V-10 and V-11. In this station the underflow or concentrate from centrifuge 23 may be re-diluted with wash water 24$^a$ and then re-thickened. In that instance, any applicable thickening apparatus may be employed as a substitute for the centrifuge 23.

With the NaCl content thus lowered to an acceptable level, the sludge via conduit 43 is passed through heating station 17 where heating to a temperature of 350° to 450°F renders the sludge inoffensive due to the destruction of pathogenic organisms, as well as readily filterable. The heating station receiving heat from a source 17$^a$ delivers a sludge adapted for immediate disposal as indicated by discharge valve V-12, for instance to land or to sea.

Alternatively, the heat-treated sludge may be delivered via valve V-13 and conduit 44, to the decant-storage tank 18 producing a more concentrated sludge for disposal to land or sea as indicated by underflow discharge valve 14$^a$ in discharge conduit 46, while overflow 47 from the tank is returned to the treatment process operation, or subjected to separate purification treatment.

Yet, depending upon individual requirements, the underflow sludge at a solids concentration of 8 to 15% from tank 18 may be subjected to still further solids concentration in a dewatering unit, for example in the solid bowl type centrifuge 19 by way of valve V-14 in transfer conduit 48, a machine capable of delivering a sludge cake at a solids concentration of about 30 to 60%. This cake material having been rendered inoffensive, may then be disposed of as land fill, indicated by valve V-15 in delivery conduit 49 or it may be subjected to combustion as in an incinerator or combustion unit 20 via valve V-16 in transfer conduit 50. The combustion unit 20 having combustion air supply 20$^a$ is herein shown as of the type wherein the sludge is subjected to combustion in a bed of fluidized sand for instance in the manner known from U.S. Pat. No. 3,319,580 to Albertson. Overflow from centrifuge 19 is returned to the process via conduit 50$^a$ or it may be subjected to separate purification treatment.

In a preferred form the heat treatment station 17 shown in FIG. 2 comprises a two-stage heating system wherein a first heat exchanger or economizer unit 51 is operated to effect the preheating of the sludge. A secondary source of heat 52, boosts the temperature of the preheated sludge to within a range from about 350° to about 450°F. Normally, a boiler 53 supplies secondary heat. At these temperatures the sludge passes through a reactor 54, in order to insure a detention time sufficient to allow for full conditioning of the sludge to take effect. The thus substantially sterilized sludge in passing through the economizer heat exchanger 51 preheats the incoming sludge.

The boiler for the booster heat exchanger may be fired by any of the conventional fuels including digester gas. However, a waste heat boiler may be employed utilizing the heat of the combustion gases from the sludge combustion unit 20.

A detailed description of the nozzle type centrifuge 23 (FIG. 3), of the solid bowl centrifuge (FIG. 4), and of the screening unit (FIG. 5) are presented below.

Embodiment B

This embodiment differs from "Embodiment A", in that raw sewage 26 is subjected to initial sedimentation, entering the primary settling tank 10 via valve V-17 in feed conduit 87. Overflow 88 from this tank containing non-settleable solids and dissolved sewage matter along with the NaCl is then subjected to treatment similar to "Embodiment A", except that in this instance the degritting cyclone 21 and screening station 22 may be by-passed since grit and oversize material are intercepted already in the primary clarifier 10. Otherwise, the treatment similarly may comprise passage through biological tank 11, secondary clarifier 12, nozzle type centrifuge 23, with or without NaCl-removal, optional NaCl-removal station 24, heating station 17, decant storage tank 18, dewatering unit 19, and combustion unit 20.

The underflow from the primary settling tank 10 delivered at a solids concentration in a range of about ½ to about 5% may be treated in any conventional or known manner, separate from the overflow 88. As herein indicated the underflow through valve V-23 may pass through cyclone 23 for degritting, or it may by-pass the cyclone via valve V-23$^a$ to reach the thickening tank 14 to be subjected to concentration producing an underflow that may attain a total solids concentration of about 10%. Other means of thickening, or for instance centrifuging, may be employed at this stage. This underflow may then leave this system via valves V-21 and V-22 to be subjected separately to any suitable method of disposal via conduit 92. Overflow 91$^a$ from thickener 14 is returnable to the treatment process.

Embodiment C

This embodiment differs from "Embodiment B" insofar as the primary sludge from settling tank 10 is subjected separately to degritting and NaCl-removal treatment operation, then to be combined in a mixing station 16 with secondary sludge which has undergone the treatment of "Embodiment B" including NaCl-removal.

For this purpose, the underflow from the primary settling tank 10 is sent via the degritting cyclone 13 and via conduit 93 to thickener tank 14. The underflow from this tank reaches the mixing station 16 via valves V-21 and V-24.

While in transit from the primary clarifier 10 to mixing station 16, the sludge is subjected to NaCl-removal by means of wash water which may be introduced at one point or at several points in combination. Accordingly, wash water introduction is indicated at 94 through valve V-25, diluting the feed into the cyclone 13, at 95 through valve V-26, diluting the feed into thickener 14, and a NaCl-removal station 15 with inlet valve V-27 and outlet valve V-28, wherein the underflow from tank 14 may be diluted by wash water admitted through valve 26$^a$ and then re-thickened.

The thus conditioned sludge mixture with the NaCl suitably reduced and grit removal effected in cyclone 13, may then be subjected to the heat treatment in station 17, and to the further disposal steps set forth in "Embodiment A" and "Embodiment B" above.

Embodiment D

This embodiment differs from "Embodiment C" including primary and secondary sedimentation in clarifiers 10 and 12 resp. in that the secondary sludge from clarifier 12 is not treated separately, but is combined with primary sludge from clarifier 10, and that the mixed sludge is subjected to degritting, thickening, NaCl-removal, and heat treatment for disposal.

Accordingly, the secondary underflow via conduits 97 and 89 and valves V-29 and V-18 joins the primary underflow at point P-1, the mixture then to be treated in the manner set forth in "Embodiment C" by passing through degritting cyclone 13, thickener 14, heating station 17, decant-storage tank 18, dewatering unit 19, and combustion unit 20. Again, wash water for effecting NaCl removal may be applied through valves V-25 and V-26, and/or NaCl removal station 15 receiving diluting water through valve $26^a$. Secondary sludge from conduit 97 may pass directly to the thickening unit 14 by way of valve V-19 and conduit 90, joining the underflow from primary clarifier 10 at point P-2.

Embodiment E

This embodiment differs from "Embodiment D" including primary and secondary sedimentation in clarifiers 10 and 12 resp., in that the primary sludge having been degritted in cyclone 13, and thickened in tank 14 to about 10% total solids concentration, is transferred via valve V-30 in conduit 98 into the decant-storage tank 18, but without previous NaCl-removal. This still offensive sludge thus by-passing the heat treatment station 17, mixes with heat treated inoffensive secondary sludge, producing an underflow for disposal by combustion, as in the manner previously set forth, by way of the dewatering unit here shown in the form of the solid bowl centrifuge 19 and the combustion unit 20.

Another valve V-31 in conduit 99 is provided for optionally by-passing the decant-storage tank 18, whereby the thickened underflow from tank 14 may be transferred directly to the dewatering unit 19.

Detailed Description of the Nozzle Type Centrifuge of FIG. 3

The nozzle type centrifuge machine according to FIG. 3, exemplified also in U.S. Pat. No. 2,559,453, mainly comprises a rotor 100 provided with peripherally arranged underflow discharge nozzles $100^a$, and having an overflow 101 for separated liquid at its upper constricted end. The rotor has an upwardly extending shaft 102 suspended from a thrust bearing 103 for rotation of the rotor in a housing structure 104. Such a machine is equipped with means for controlling the solids concentration of the underflow fraction discharging from the nozzles. The control means comprise underflow return conduit 105 terminating in the upwardly directed induction nozzle 106. The discharge valve V-6 is operable to control the rate of underflow recirculation through the return conduit 105, and thereby to control the solids concentration of the underflow material delivered by the nozzles of this machine.

More particularly, the rotor bowl comprises a pair of trunco-conical end portions 107 and 108 with underflow discharge nozzles arranged in the peripheral zone of the bowl where the wide ends of the trunco-conical portions join each other. A hub portion 109 defines a centrifugal separating chamber 110 above, and an influent receiving chamber 111 below, with divergent inflow ducts 112 leading from the receiving chamber to the region of the nozzles.

The shaft 102 is surrounded by a feedwell member 113 which in turn is surrounded by the usual stock separator discs 114 located in the separating chamber 110. A stationary annular feed supply duct 115 surrounding the shaft 102 extends from the top of the housing into the feedwell 113, having a lateral influent connection 116.

Through inlet 117 at the lower end of the feedwell member 113 the dilute feed suspension enters the separating chamber 110 of the rotor bowl, while centrifugally concentrated matter discharges through the nozzles into the surrounding portion 118 of the housing, and separated liquor discharges by way of overflow 101 into the receiving chamber 119 of the housing.

The relatively concentrated underflow fraction from the rotor nozzles leaves the machine through control valve V-6, while underflow material is kept recirculating at an adjusted rate through the return conduit 105 and induction nozzle 106 into the receiving chamber 111 of the rotor bowl and then through the divergent ducts 112 to the region of the nozzles in the separating chamber of the bowl.

In operation, the solids concentration of the underflow material may be relatively increased by throttling the discharge valve V-6, due to increase of the underflow recirculation rate. Conversely, a lowering of the solids concentration of the underflow may be effected by correspondingly opening the valve V-6. In either instance, after an adjustment of the discharge valve V-6 has been made, the operation of the machine will balance itself at the resulting respective solids concentration. Wash water may be admitted into the return circuit 105 at a controlled rate regulated by the operation of valve V-7.

Figure 4:
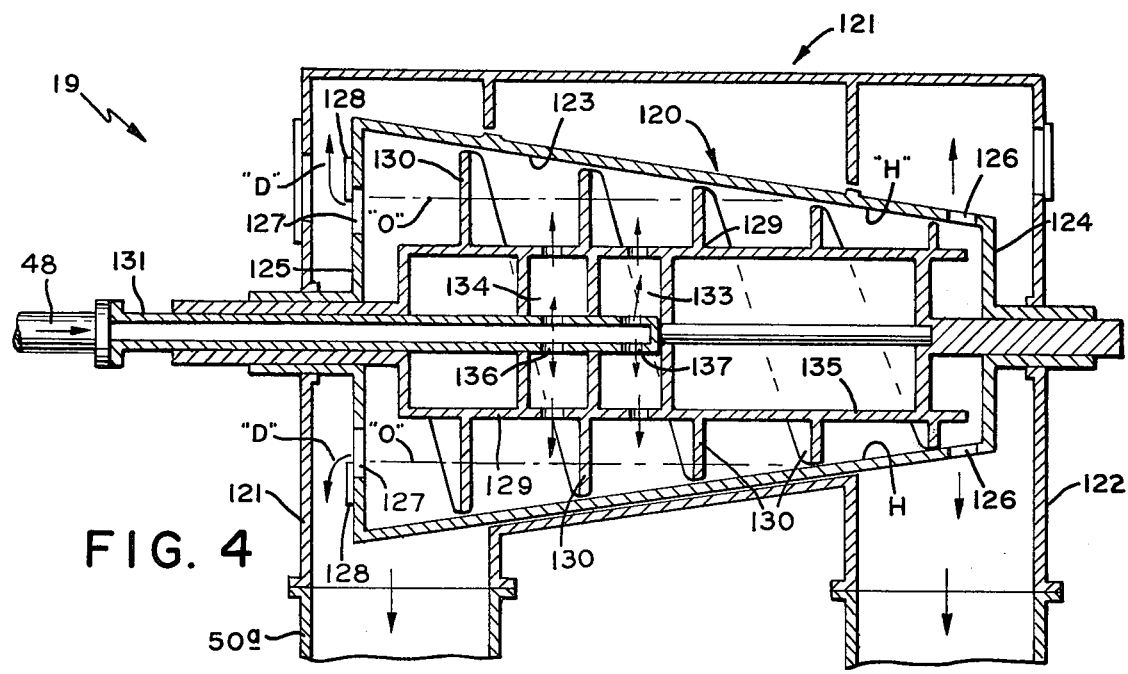
FIG. 4 is a greatly enlarged vertical sectional view of a solid bowl type centrifuge employed in the flowsheet, schematically shown.

Detailed Description of the Solid Bowl Type Centrifuge of FIG. 4

In distinction from the "nozzle type" centrifuge 23 of FIG. 3, the "solid bowl" type centrifugal machine 19 of FIG. 4 is designed to operate in a manner, at suitable feed solids concentration, whereby the concentrate discharges as a moist cake material with a 30–50% solids concentration, as compared with the aforementioned relatively dilute underflow solids concentration of 3–8% obtainable from the nozzle type machine.

For that purpose, the solid bowl type machine 19 has a rotor structure 120 rotating in a housing 121 which may be sealed against the atmosphere, being connected to overflow discharge conduit $50^a$, and concentrate discharge conduits 49, and 50 see also FIG. 1.

The housing has a discharge neck 121 at the wide end of the trunco-conically shaped rotor structure and connected to the conduit $50^a$ for delivering the overflow fraction. The separated solids or cake fraction leaves the machine through a discharge neck 122 for disposal.

The rotor structure has a trunco-conically shaped body portion 123 provided with an end closure plate 124 at the narrow end, and with another end closure plate 125 at the opposite or wide end of body portion 123. The separated solids or moist cake fraction discharges centrifugally from the rotor bowl through openings 126 provided adjacent to the narrow end of the bowl. The opposite end closure plate 125 has overflow openings 127 associated with adjustable weir plates 128 determining the overflow level of the annular body O of liquid undergoing centrifugal separation in the bowl. Arrows D at the wide end indicate delivery over these weir plates of the overflow fraction being returned to the treatment process.

Within the trunco-conically shaped rotor bowl of this machine there is rotatably mounted a conically shaped spiral blade conveyer element 129 conforming to the inner conical contour of the bowl, and adapted to be rotated at a differential speed relative to the rotation of the bowl, such that the spirally shaped conveyer flights 130 will move the centrifugally separated solids out of the liquid body O to emergence onto the narrow end portion, the so-called beach portion H of the bowl, for discharge through opening 126, in the form of moist cake material for disposal.

Feed sludge or solids suspension entering this machine through an axially arranged stationary feed inlet tube 131 passes into receiving chambers 133 and 134 formed in the hollow cylindrical hub portion 135 surrounding the feed inlet tube. From these annular receiving chambers the feed material passes through openings 136 and 137 into the annular liquid body O undergoing centrifugal separation in the bowl.

Detailed Description of the Screening Unit of FIGS. 5 and $5^a$

This type of screening unit known substantially from U.S. Pat. No. 3,259,244 to Kaljo, has a convexly curved screen surface or deck 138 of the wedge bar type as shown in U.S. Pat. No. 2,916,142 to Fontein. FIG. $5^a$ is an enlarged fragmentary detail view showing in cross-section the configuration and screening function of the horizontal wedge bars 139 constituting the convexly curved screening surface.

In this example, a 45° bar screen is employed. The 45° configuration of the screen surface is a 45° arc of a circle. This screen surface or deck 138 confined between side walls 140 and 141, tangentially and releasably joins the feed overflow weir 142 which has parabolic cross-sectional configuration. The lower end of the curved screen deck is releasably secured to discharge spout 143 delivering the oversize fraction 31 to be recycled.

The collecting chamber $143^a$ for the desired underflow fraction is basically defined by the screen deck 138, front wall plate 144, rear wall plate 145, bottom plate 146, and the aforementioned side walls 140 and 141 each of which has provided at the bottom an underflow discharge opening 147.

For the purpose of delivering feed material to the screen deck 138, a feed box 148 is secured to the side walls 140 and 141 and to the rear wall plate 145. A feed inlet neck 149 extends from the rear wall 150 of the feed box. The parabolic weir 142 extends the full width between side walls 140 and 141, and is sealed with respect thereto, so as to prevent leakage of feed material around the weir, and it cooperates with a pivotally mounted depending baffle $142^a$, swingable about the horizontal axis.

In operation, the feed material to be fractionated is introduced into the feed box and rises to a point where it spills over the parabolic weir, distributed along the entire length thereof. The feed material then falls tangentially over the full width of the screen surface at a predetermined velocity. The feed material flows down along the convexly curved surface of the screen deck at right angles to the spaces 151 between the screen bars 139. Due to the drag on the feed sludge suspension passing over the screen bars along the convex curvature of the screen, a thin layer at the underside is deflected and passes out between the bars. The underflow fraction thus collected in the discharge chamber $143^a$ is delivered through the discharge openings 147 and conduit 32, to centrifuge 23 while the oversize fraction passes off from the lower end of the screen and through conduit 31 for recycling.

I claim:

1. The method of treating sewage containing concentrations of NaCl from salt water infiltration, which become highly corrosive at sewage sludge sterilizing temperatures, which method comprises subjecting the sewage to treatment producing biologically treated sludge, subjecting said biologically treated sludge to centrifugal separating concentrating treatment in a nozzle type centrifugal machine having a centrifugal separating chamber to which the sludge is fed, delivering through the nozzles of the machine a concentrated underflow fraction of controllable concentration, and an overflow fraction of separated liquid, feeding wash water into said centrifugal separating chamber at a rate effective to block NaCl by said wash water from discharging with the underflow fraction by displacing said NaCl by said wash water towards overflow, thereby effecting delivery of underflow sludge substantially freed of NaCl, and an overflow containing said displaced NaCl, and heating said underflow sludge from the centrifugal machine by passage through heating apparatus that would otherwise be susceptible to corrosion by the displaced NaCl at said sterilizing temperatures.

2. The method according to claim 1 wherein said sterilized sludge is subjected to solids concentration by sedimentation.

3. The method according to claim 1, wherein said sterilized sludge is subjected to solids concentration to the extent of moist cake consistency.

4. The method according to claim 1, wherein said sterilized sludge is subjected to solids concentration to the extent of producing a moist cake material, and said cake material is subjected to combustion.

5. The method according to claim 1, wherein said sewage sludge is subjected to a separating operation effecting the removal of gritty and oversize material from the sludge.

6. The method according to claim 1, wherein said sludge is subjected to a cyclonic separation effective to remove gritty matter from an overflow containing the degritted sludge, and wherein said degritted sludge is subjected to further separating treatment effecting the elimination of oversize material from the sludge.

* * * * *